United States Patent [19]
Thibault et al.

[11] Patent Number: 5,532,086
[45] Date of Patent: Jul. 2, 1996

[54] ANODE ASSEMBLY WITH THIN METAL CURRENT COLLECTOR AND ELECTROCHEMICAL CELL COMPRISING AN ANODE SUPPORT STRUCTURE AND A GAS RELEASE SYSTEM

[75] Inventors: William C. Thibault, Powder Springs; Edward S. Buzzrelli, Kennesaw, both of Ga.

[73] Assignee: AER Energy Resources, Inc., Atlanta, Ga.

[21] Appl. No.: 269,658

[22] Filed: Jun. 30, 1994

[51] Int. Cl.⁶ .................................................. H01M 4/66
[52] U.S. Cl. .......................... 429/245; 429/66; 429/82; 429/234; 428/626; 428/658; 428/673
[58] Field of Search .......................... 429/27, 66, 82, 429/234, 245, 246; 204/290 R; 428/626, 658, 673

[56] References Cited

U.S. PATENT DOCUMENTS

| | | | |
|---|---|---|---|
| 1,990,976 | 2/1935 | Booss | 136/147 |
| 2,694,100 | 11/1954 | Zahn | 429/234 |
| 3,023,259 | 2/1962 | Coler et al. | 136/6 |
| 3,026,365 | 3/1962 | Hughes et al. | 136/100 |
| 3,069,486 | 12/1962 | Solomon et al. | 136/30 |
| 3,288,644 | 11/1966 | Delfino | 136/86 |
| 3,395,047 | 7/1968 | Terry et al. | 136/86 |
| 3,457,115 | 7/1969 | Kent | 136/86 |
| 3,518,123 | 6/1970 | Katsoulis et al. | 136/86 |
| 3,607,411 | 9/1971 | Brownrigg | 136/37 |
| 3,650,837 | 3/1972 | Palmer | 136/86 |
| 3,694,265 | 9/1972 | Sundberg | 136/63 |
| 3,759,748 | 9/1973 | Palmer | 136/86 |
| 3,935,027 | 1/1976 | Warde et al. | 136/86 |
| 3,960,600 | 6/1976 | Chodosh | 136/120 |
| 3,977,901 | 8/1976 | Buzzelli | 136/86 |
| 3,985,581 | 10/1976 | Stachurski et al. | 429/51 |
| 4,084,047 | 4/1978 | Himy et al. | 429/206 |
| 4,118,551 | 10/1978 | Chireau et al. | 429/207 |
| 4,151,331 | 4/1979 | Hug et al. | 429/94 |
| 4,168,349 | 9/1979 | Buzzelli | 429/14 |
| 4,189,533 | 2/1980 | Sugalski | 429/223 |
| 4,284,693 | 8/1981 | McDowell | 429/211 |
| 4,346,153 | 8/1982 | Rigal et al. | 429/234 |
| 4,461,812 | 7/1984 | Mascioli | 429/29 |
| 4,614,025 | 9/1986 | vanOmmering et al. | 29/623 |
| 4,623,597 | 11/1986 | Sapru et al. | 429/101 |
| 4,828,939 | 5/1989 | Turley et al. | 429/27 X |
| 4,842,963 | 6/1989 | Ross, Jr. | 429/21 |
| 4,957,826 | 9/1990 | Cheiky | 429/27 |
| 4,973,533 | 11/1990 | Nieminen et al. | 429/82 |
| 5,085,956 | 2/1992 | Imhof et al. | 429/211 |
| 5,126,219 | 6/1992 | Howard et al. | 429/252 |
| 5,264,306 | 11/1993 | Walker et al. | 429/160 |

FOREIGN PATENT DOCUMENTS

| | | |
|---|---|---|
| 0294327 | 12/1988 | European Pat. Off. . |
| 0533576 | 3/1993 | European Pat. Off. . |
| 1235236 | 5/1960 | France . |
| 2179565 | 11/1973 | France . |
| 2386148 | 10/1978 | France . |
| 1953305 | 6/1970 | Germany . |
| 2127191 | 12/1971 | Germany . |
| WO93/12554 | 6/1993 | WIPO . |

OTHER PUBLICATIONS

Chodosh, S. M. et al., Zinc–Air Battery Systems, Power Sources 2 1968, 6th International Symposium, Sep. 1968, pp. 423–439.

Himy A. Nickel–Zinc vs. Silver–Zinc Battery: A Comparative Study of Baseline Characteristics, IECEC Conference, Proceedings, vol. I, Aug. 1978.

*Primary Examiner*—Stephen Kalafut
*Attorney, Agent, or Firm*—Jones & Askew

[57] ABSTRACT

An anode for use in an electrochemical cell comprising a current collector layer having a thickness less than about 10 mils, and desirably less than about 4 mils, and a rigid support extending adjacent one side of the current collector layer so that the current collector layer is sandwiched between the anodic layer of the anode and the rigid support. The rigid support maintains the current collector layer in the original configuration of the current collector layer during discharge and recharge cycles of the cell. A cell containing the anode is also disclosed. The rigid support for the anode current collector can be mounted in the electrochemical cell case so as to allow for the release from the cell of gas produced at the anode.

59 Claims, 6 Drawing Sheets

Fig_1

Fig_2

Fig_6C

Fig_6D

Fig_7

Fig_8A

5,532,086

ANODE ASSEMBLY WITH THIN METAL CURRENT COLLECTOR AND ELECTROCHEMICAL CELL COMPRISING AN ANODE SUPPORT STRUCTURE AND A GAS RELEASE SYSTEM

TECHNICAL FIELD

This invention relates to anodes for electrochemical cells, and more particularly relates to anodes for rechargeable metal-air electrochemical cells.

BACKGROUND OF THE INVENTION

Electrochemical cells provide electrical power via a chemical reaction. A typical electrochemical cell includes a pair of electrodes called an anode and a cathode separated by an electrolyte composition. The anode, cathode, and electrolyte are contained in a casing and when the anode and cathode are electrically connected to a load, a chemical reaction between the anode, cathode, and electrolyte releases electrons and delivers electrical energy to the load. Although the anode of the invention disclosed herein is generally applicable to electrochemical cells, it was particularly designed for use in metal-air cells.

Metal-air cells utilize oxygen from ambient air as a reactant in an electrochemical reaction to provide a relatively lightweight power supply and include an air permeable cathode and a metallic anode separated by an aqueous electrolyte. Metal-air cells have a relatively high energy density because the cathode utilizes oxygen from ambient air as a reactant in the electrochemical reaction rather than a heavier material, such as a metal oxide or another depolarizable metallic composition. For example, during operation of a zinc-air cell, oxygen from the ambient air is converted at the cathode to hydroxide ions, zinc is oxidized at the anode, reacts with hydroxide ions, and water and electrons are released to provide electrical energy.

Cells that are useful for only a single discharge cycle are called primary cells, and cells that are rechargeable and useful for multiple discharge cycles are called secondary cells. An electrically rechargeable metal-air cell is recharged by applying voltage between an anode and the cathode of the cell and reversing the electrochemical reaction. During recharging, the cell discharges oxygen to the atmosphere through the air permeable cathode and the anode is electrolytically reformed by reducing to the base metal the metal oxides formed during discharge.

Metal-air cell anodes are made from metals which can be oxidized during discharge in a metal-air cell to produce electrical energy. Such metals include lead, zinc, iron, cadmium, aluminum, and magnesium. Zinc is normally preferred because of the availability, energy density, safety, and relatively low cost of zinc. Typically, anodes include a layer of anodic material which is capable of being oxidized in the cell to produce electricity during discharge of the cell and a current collector made of a metal which is capable of conducting electricity produced during discharge of a cell but not being oxidized during discharge of the cell. Typical metals for the current collector include copper, nickel, tin, titanium, or a metallic substrate coated with these materials.

Metal-air anodes can be made by compressing metal particles, such as metal powder, under suitable conditions of heat or pressure, or both, to form a porous cake. The porous cake can be formed directly onto the current collector. In addition, metal-air anodes can be made from a body of solid, anodic, non-particulate metal, in which case, the current collector is positioned against the body of anodic metal in the cell and is held against the body of anodic material by pressure from the cell casing and the other components of the cell.

Good electrical contact between the anodic material and the current collector of an anode is necessary for efficient production of electricity from the cells. Without good electrical contact between the anodic material and current collector of an anode, the surface of the current collector can become oxidized. The oxidation forms an insulative layer about the current collector. When this insulative layer is formed, the current collector does not effectively conduct electricity from the cell, generates gas within the cell, and causes the cell to fail. This problem is a greater concern with anodes made with a body of solid, non-particulate metal because the current collector is not initially embedded in the anodic material as is the case with anodes made by compressing metal particles to form a porous cake onto the current collector.

Anode current collectors typically are foraminous metal screens, perforated sheet metal or expanded, perforated sheet metal. Anode current collectors are desirably perforated to allow gas produced by the anode to pass through the current collector, and to a vent, for release from the cell. Perforated current collectors are useful in making particulate metal anodes because the anodic layer can be moved as a layer of paste on top of the perforated current collector. The paste settles into the perforations of the current collectors and provides a strong bond between the anodic layer and the current collector. Unfortunately, perforations in a current collector reduce the contact area between the current collector and the anodic layer of an anode and results in uneven current density across the anode. For example, a perforated or foraminous current collector that has forty percent open area, has only a sixty percent current collector contact area.

It is desirable to have full contact between the anodic layer and the current collector and have substantially even current density across the anode.

Substantially full contact between the current collector and the anodic layer can be achieved with an unperforated current collector that extends substantially across an entire side of the anodic layer. Such an unperforated current collector provides substantially even current density across the anode. However, unperforated current collectors are heavy and therefore reduce the overall density of the cell. Unperforated, metal current collectors can also be expensive such as when the current collector is made of silver.

Silver is desirable as an anode current collector because anodes with silver current collectors produce low levels of gas during recharge. To reduce the cost of a silver current collector, copper current collectors are plated with silver. However, the silver on silver coated copper current collectors tends to corrode, thereby exposing the copper which readily produces gas during recharge of the cell. The cost of pure silver sheet metal is expensive and can be cost prohibitive for use as an anode current collector, particularly, in metal-air cells.

Therefore, there is a need for an anode with enhanced reliability, and in particular, an anode that has an effective and durable electrical connection between the anodic material and the current collector, produces a low level of gas, and is economical.

SUMMARY OF THE INVENTION

This invention fulfills the needs described above by providing an anode for use in an electrochemical cell, the anode having a thin current collector. Because such a thin current collector sags or relaxes when the anode is discharged and recharged due to the lack of support of the thin current collector, the anode of the present invention further comprises a rigid support extending adjacent one side of the current collector layer of the anode so that the current collector layer is sandwiched between the anodic layer and the rigid support.

More particularly, the anode of the present invention comprises a metal anodic layer, a metal current collector layer having a thickness less than about 10 mils and extending adjacent one side of the anodic layer, and a rigid support that extends adjacent one side of the current collector layer so that the current collector layer is sandwiched between the anodic layer and the rigid support. Desirably the current collector layer has a thickness less than about 4 mils.

Still more particularly, the rigid support of the anode maintains the current collector in substantially the same configuration as the original configuration of the current collector layer during discharging and recharging of the electrochemical cell. Because the anode current collector is thin and is maintained in electrical contact with the anodic layer of the anode by the rigid support, the anode of the present invention is lightweight, has a low cost and has an effective and durable electrical connection between the anodic material and the current collector. In addition, the anode of the present invention has a substantially even current density across the anode and is more durable than conventional anodes.

The metal of the anodic layer is capable of being oxidized in the electrochemical cell to produce electricity during discharge of the cell. The metal of the anodic layer can be a cake of particulate metal powder or a layer of non-particulate metal. When the electrochemical cell is a metal-air cell, the metal of the anodic layer is desirably zinc.

The metal of the current collector layer is capable of conducting electricity produced during discharge of the electrochemical cell, but not being oxidized during discharge of the cell. In a metal-air electrochemical cell, the current collector metal is desirably silver. More particularly, the current collector metal of the anode of the present invention comprises metal foil. Silver foil is particularly desirable. When silver is the current collector metal, the anode of the present invention produces a low level of gas during recharge of the cell. Alternatively, the metal of the current collector can be plated onto the rigid support or the anodic layer.

The rigid support of the anode of the present invention comprises a material that is not capable of being oxidized during discharge of the cell. Suitable materials for making the rigid support include thermoplastic polymers that are nonreactive with the electrolyte in the cell. Polypropylene is a particularly suitable polymer for the rigid support.

More particularly, the rigid support of the anode of the present invention forms a flow path for releasing gas produced at the anode during operation of the electrochemical cell. The flow path can be formed by channels in the rigid support, openings in the rigid support, or pores in the rigid support such as when the rigid support comprises a layer of porous polypropylene.

Likewise, the current collector layer desirably forms a flow path for releasing gas produced at the anode. Openings in the current collector layer can form such a flow path. More particularly, both the current collector and the rigid support form the flow path for releasing gas produced at the anode.

According to another aspect of the present invention, an electrochemical cell is provided comprising a cathode, an anode, electrolyte, and a rigid support for the anode, all disposed in a cell case. The anode comprises an anodic layer of a metal and a current collector layer of a metal. The current collector layer extends adjacent one side of the anodic layer. The rigid support extends adjacent one side of the current collector layer so that the current collector layer is sandwiched between the anodic layer and the rigid support. In addition, the anode is positioned between the cathode and the rigid support. The cell case has an opening for releasing gas produced at the anode. The rigid support is mounted in the case and spaced apart from at least a portion of the case so as to form a flow path for the gas to follow from the anode, to and through the opening in the case.

According to still another aspect of the present invention, an electrochemical cell is provided wherein the rigid support for the anode comprises a mechanical spring and is mounted in the cell case so as to be forceably biased against one side of the current collector layer. Suitable mechanical spring structures for the rigid support include a bowed plate or a leaf spring so that when the cell is constructed, the rigid support is compressed and forces the current collector layer against the anodic layer of the anode. This provides for enhanced contact between the current collector and the anodic layer across the anode.

Accordingly, an object of the present invention is to provide an improved anode for use in an electrochemical cell.

Another object of the present invention is to provide an improved anode for use in a metal-air cell.

Another object of the present invention is to provide an anode that is more reliable and efficient and has a longer useful life.

Still another object of the present invention is to provide an anode with an enhanced electrical connection between the anodic material and the current collector.

Another object of the present invention is to provide an anode that produces low levels of gas at the anode.

Yet another object of the present invention is to provide an improved electrochemical cell.

Other objects, features and advantages of the present invention will become apparent from the following detailed description, drawings, and claims.

DETAILED DESCRIPTION OF DRAWINGS

As summarized above, the present invention encompasses an anode for use in an electrochemical cell comprising a thin metal current collector and a rigid support for the current collector. The present invention also encompasses an electrochemical cell comprising such an anode that includes a thin metal current collector, and further encompasses electrochemical cells having a gas release system. First, an anode made according to an embodiment of the present invention will be described in detail and that will be followed by a detailed description of electrochemical cells made according to embodiments of the present invention and alternative embodiments of current collector supports for use with the present invention.

Figure 1:
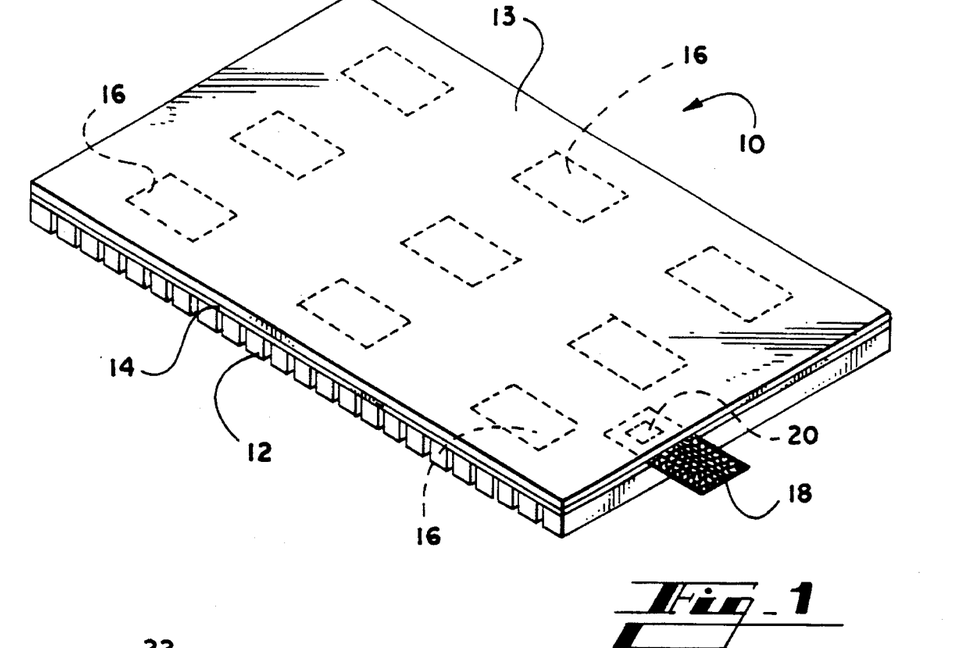
FIG. 1 is a perspective view of an anode made according to an embodiment of the present invention.

FIG. 1 shows an embodiment of an anode 10 of the present invention for use with a metal-air cell; however, it should be understood that the anode of the present invention can be used in other electrochemical cells provided the materials from which the anodes are made are compatible with the particular electrolyte and cathode.

The anode 10 comprises an anodic layer 12, a rigid support 13, and a current collector layer 14 sandwiched between the anodic layer and the current collector layer. The current collector layer 14 is a metal foil bonded to the anodic layer. The anode 10 further comprises a lead 18 for electrically connecting the anode to a load. The lead 18 extends beyond the periphery of the anode 10 and is attached to the current collector 14 with an ultrasonic weld 20.

The anodic layer 12 is desirably a sheet of solid, non-particulate metal that oxidizes under conditions of operation of an electrochemical cell to produce electrical energy. Suitable metals include zinc, aluminum, magnesium, lithium, iron, cadmium, and lead. Zinc is particularly preferred for use in metal-air cells because of the availability and low cost of zinc. The anodic layer 12 preferably has a surface with three-dimensional surface features for increasing the surface area of the layer exposed to electrolyte in an electrochemical cell. The increased exposure of the anodic layer 12 to electrolyte increases the rate of oxidation of the anodic layer during the first discharge cycle of the cell. This reduces the tendency of the anode layer 12 to passivate and increases the efficiency of the anode 10 on discharge.

Suitable three-dimensional surface features include perforations, projections, and recesses, and the like, and can be formed by a variety of methods including punching, direct forming, etching, shot peening, perforating, and expanding, sand blasting, knurling and the like. In other words, the anodic layer does not have an entirely flat or planar surface, but instead has a plurality of surface features which project inwardly or outwardly from the anodic layer.

For example, the solid, non-particulate anodic layer 12 shown in FIG. 1, is an expanded, perforated metal sheet. The expanded, perforated metal sheet is made by passing a non-perforated metal sheet through a pair of rollers having meshing teeth which form a series of slits and corresponding projections in the metal sheet.

The current collector layer 14 extends adjacently and substantially entirely across one side of the anodic layer 12, covers substantially the entire anodic layer, and is pressure bonded to the anodic layer substantially entirely across the one side of the anodic layer. The current collector layer 14 is bonded to the anodic layer 12 with a metal-to-metal bond 16 across the anodic layer so that the current collector layer is in good electrical contact with the anodic layer substantially entirely across the one side of the anodic layer and the electrical contact between the current collector layer and the anodic layer is substantially uniform.

Desirably, the current collector layer 14 is bonded to the anodic layer 12 so that the current collector layer is substantially contiguous to the anodic layer substantially entirely across the one side of the anodic layer.

The current collector layer 14 comprises a metal which is capable of conducting electricity produced during discharge of the cell, but not being oxidized during discharge of the cell. Suitable metals for the current collector 14 are non-corrosive metals such as copper, nickel, tin, titanium, or silver. The current collector 14 should be thin and need only be thick enough to carry electric current to and from the anode. The current collector 14 can be as thin as only a few molecules, is desirably less than about 10 mils thick, and more desirably less than about 4 mils thick. The current collector 14 is most desirably about 1 mil thick. Thus, the current collector 14 can take the form of a sheet of metal foil sandwiched between the anodic layer 12 and the rigid support 13, as shown in FIG. 1, or can take the form of a layer of metal plated onto either the anodic layer or the rigid support. Suitable methods of plating include electroplating, lamination bonding, sputtering, powder coating or hot stamping a foil. Another suitable method of bonding the current collector 14 is to position a metal foil current collector material in intimate contact with the anodic layer in an electrochemical cell, and then discharging and charging the cell to plate the anodic layer onto the current collector.

Desirably, the current collector 14 is a substantially solid sheet of metal that covers substantially the entire one side of the anodic layer 12 so that there is substantially uniform current density across the anode. For small anodes, holes in the current collector may not be necessary to vent gas produced at the anode, but with larger current collectors, it may be necessary to have at least a sufficient number of pin holes to vent gas through the current collector during discharge of the cell.

The anode lead 18 is made of the same type metal that forms the current collector 14. The lead 18 can be an integral part of the current collector layer 14 or can be a separate lead 18 attached to the current collector 14 as shown in FIG. 1. This is particularly advantageous when the current collector layer 14 is a solid, substantially unperforated metal sheet such as metal foil because the lead 18 can be made from foraminous material which is less likely to form a leak path for electrolyte between the lead and the cell case. The lead 18 shown in FIG. 1 is made of expanded metal.

Suitable methods for bonding the current collector layer 14 to the anodic layer 12 include pressure bonding which is a method for joining parts together with pressure and with or without heat. No filler metal is employed in pressure bonding. The parts to be joined are first locally heated at the place where the joint is to be formed and are then squeezed together so that they are united with a metal-to-metal bond. Pressure bonding can be performed by passing two layers of metal through the nip between two rollers or pressing the two layers of metal between a platen and a stationary anvil. Another method of pressure bonding is ultrasonic bonding.

The current collector layer 14 and the anodic layer 12 should be pressure bonded at a temperature and pressure sufficient to create a metal-to-metal bond between the current collector layer and the anodic layer without distorting the current collector layer or the anodic layer. To avoid melting and distortion, the temperature of the heated roller or platen should be less than the melting point of the lowest melting metal of the current collector layer or the anodic layer. For example, a current collector layer comprising a 1 mil thick sheet of silver foil can be pressure bonded to an anodic layer comprising a sheet of expanded, perforated non-particulate metal zinc by pressing the entire current collector layer and anodic layer between a platen having a temperature within the range from about 650° F. (343° C.) to about 750° F. (398° C.) and an anvil at a pressure within the range from about 1,500 to about 5,000 psi. The silver current collector layer is positioned adjacent the heated anvil. This achieves electrical contact between the current collector layer and the anodic layer across substantially the entire one side of the anodic layer. For more efficient manufacturing, the current collector layer and the anodic layer metals are in the form of a clad metal sheet which is made by passing the two layers of metals through the nip between two rollers at elevated temperature and pressure.

The rigid support 13 comprises a material that is not capable of being oxidized during discharge of the cell so that the rigid support maintains support of the current collector during operation of the cell. The purpose of the rigid support 13 is to maintain the current collector layer 14 in a configuration which is substantially the same as the original configuration of the current collector layer during discharging and recharging of the cell. In FIG. 1, the original configuration of the current collector layer 14 is a planar sheet. Thus, the rigid support 13 is a planar sheet and is of sufficient rigidity to maintain the current collector layer 14 in that configuration during operation of the cell. As shown in FIG. 1, the rigid support 13 extends across substantially the entire current collector layer 14 opposite the anodic layer 12 so that the current collector layer is sandwiched between the anodic layer and the rigid support.

Suitable materials for making the rigid support include thermoplastic polymers such as polypropylene, polyethylene, polyacetal, polysulfone, nylon, polyvinylchloride, polyphenylene oxide, and polyphenylene sulfide, and other polymers such as epoxy and polytetrafluoroethylene.

The rigid support 13 shown in FIG. 1 is a substantially solid flat sheet. However, it should be understood that the rigid support 13 should not block the venting of gas produced during recharging of electrochemical cells. Desirably, the rigid support 13 forms a flow path for releasing gas produced at the anode. Porous or perforated materials can be used to form a rigid support that allows the release of gas. POREX porous polypropylene available from Porex Technologies, of Fairburn, Ga. is useful to make the rigid support and allows the flow of gas therethrough. Alternative embodiments of the rigid support are shown in FIGS. 6A, 6B, 6C, 6D, 7, and 8 below.

Figure 2:
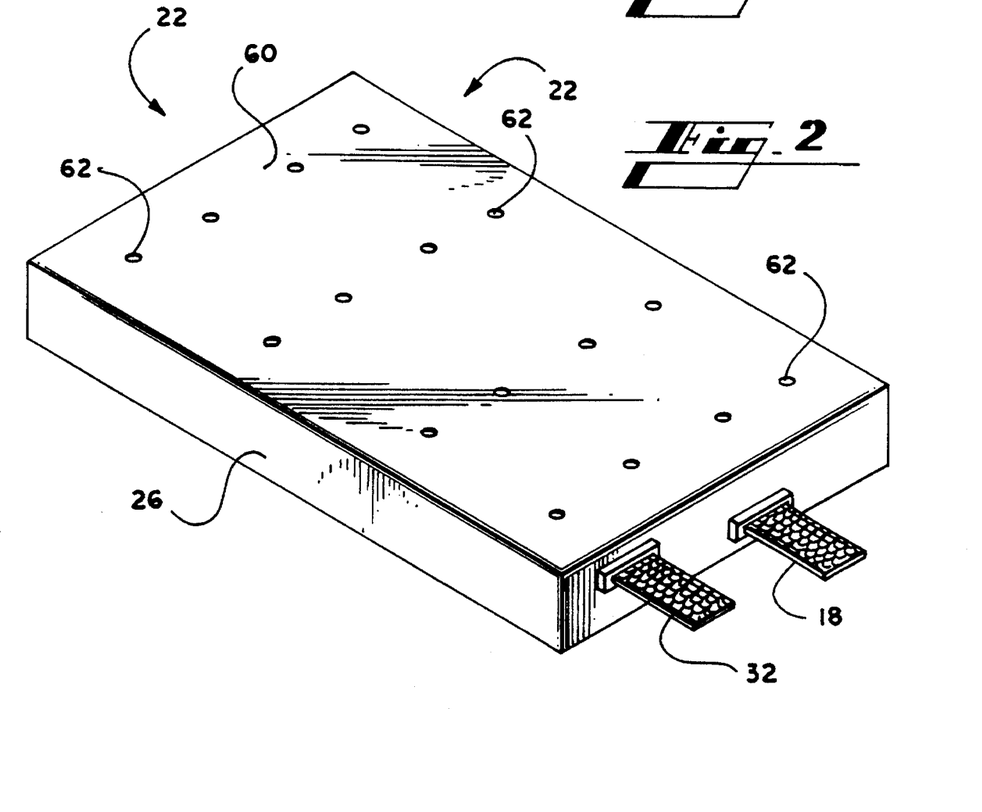
FIG. 2 is a perspective view of a secondary metal-air cell including the anode shown in FIG. 1.
Figure 3:
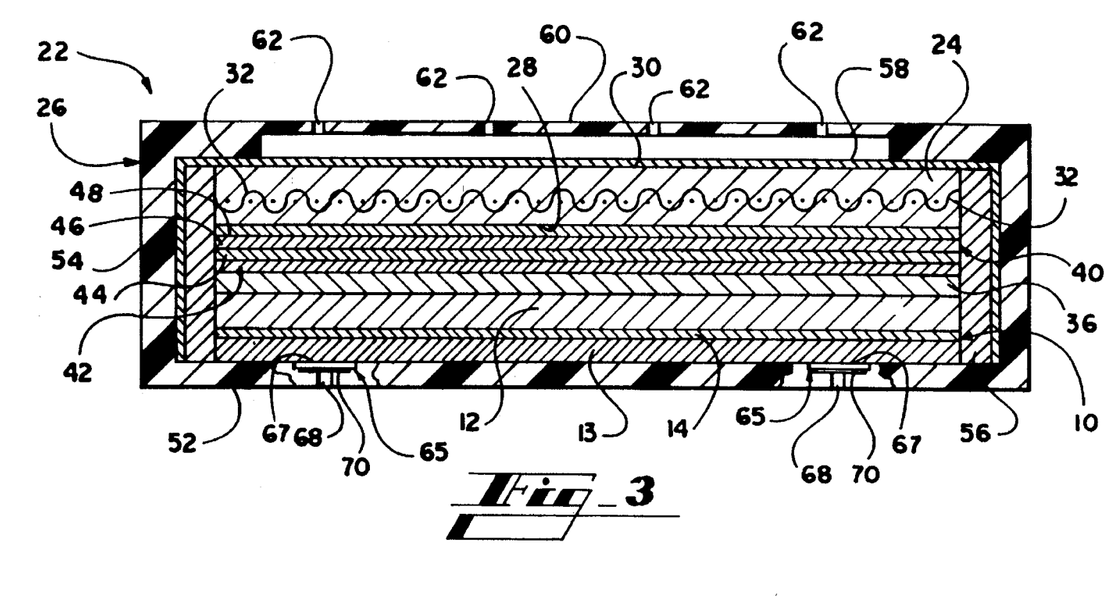
FIG. 3 is a partial, cross-sectional, elevation view of the metal-air cell shown in FIG. 2.

As mentioned above, the anode 10 is particularly suitable for use in a metal-air cell. A suitable metal-air cell 22 is shown in FIGS. 2 and 3 and generally comprises the anode 10, an air cathode 24, and an electrolyte disposed in a cell case 26.

A suitable electrolyte is an aqueous electrolyte including a Group I metal hydroxide such as LiOH, NaOH, KOH, CsOH, or the like.

A suitable air cathode 24 is a porous, sheet-type cathode including an active layer directly adhered to a gas-permeable, liquid-impermeable, wet-proofing layer as disclosed in U.S. Pat. Nos. 3,925,100; 3,935,027; 3,977,901; 4,152,489; 4,168,349; 4,341,848; 4,444,852; 4,354,958; 4,518,705; 4,615,954; and 4,927,514, the disclosures of which are expressly incorporated herein by reference. The active layer of the cathode 24 forms the electrolyte side 28 of the cathode and faces the electrolyte. The active layer includes catalyzed particles of activated carbon and particles of a hydrophobic polymer such as polytetrafluoroethylene. The wet-proofing layer forms the air side 30 of the cathode and includes a mixture of carbon black particles and polytetrafluoroethylene particles. The cathode 24 further includes a metal current collector 32 which has a lead 34 extending therefrom for connection to a positive terminal for the cell 22. Suitable current collectors include fine mesh metal screens and expanded, perforated metal sheets made of non-corrosive metal such as nickel, tin, or titanium.

A suitable cathode can be made in accordance with U.S. Pat. No. 3,977,901 with the following recipe:

| ACTIVE LAYER | |
| --- | --- |
| Component | Loading (mg/cm$^2$ of Cathode) |
| carbon black (Shawinigan) | 68.5 |
| Teflon T30B | 14.2 |
| Ag | 2.6 |
| NiS | 3.4 |
| FeWO$_4$ | 3.4 |
| WC/12 wt % Co | 3.4 |

| HYDROPHOBIC LAYER | |
| --- | --- |
| Component | Loading (mg/cm$^2$ of Cathode) |
| carbon black | 19.5 |
| Teflon T30B | 3.5 |

The metal-air cell 22 further comprises a porous web 36 contiguous to the electrolyte side of the anode 10. The porous web 36 comprises entangled fibers made from a material which is oxidation-resistant under conditions of operation of a metal-air cell and absorbs electrolyte in the cell. The porous web 36 is desirably made of polymeric fibers or filaments with substantial void space between the fibers or filaments. Suitable polymers for making the porous web 36 include nylon, polypropylene, and polyvinyl alcohol. The porous web 36 extends substantially completely across the anodic layer 12 of the anode 10 and is wettable and wicks and distributes the electrolyte across the electrolyte side of the anode. If not naturally wettable with electrolyte, the polymeric fibers or filaments can be surface treated with surfactants or other means to become wettable.

During the first discharge/recharge cycle of a metal-air cell containing the anode 10, the anodic layer 12 is oxidized on discharge to metal oxides or metal ions and on recharge is reformed as a body or cake of particulate metal. The porous web 36 is permeable to the electrolyte and to the ions and compounds of the metal from the anodic layer 12 in the electrolyte of the cell so that during recharging of the cell, the metal can be reformed interstitially through the web into a porous metal structure. The porous web 36 therefore increases the porosity of the anode 10 so that the anode does not become over densified and passivate and the interior of the anodic layer 12 is accessible to electrolyte. A suitable material for the porous web 36 is a nylon fiber web available as Nylon #TR1113G available from Hollingsworth & Vose of East Walpole, Mass. Although not shown in FIG. 3, the cell 22 may further comprise another porous web sandwiched between the current collector layer 14 and the rigid support 13 for wicking electrolyte and cooling the anode 10. A suitable material for this is a web of polyvinyl alcohol and rayon fibers available from the Dexter Corporation of Windsor-Locks, Conn. under the designation 7487.

The metal-air cell 22 further comprises a separator package 40 disposed between the anode 10 and the cathode 24. The separator package includes first and second polymer separator layers 42 and 44 proximate the anode 10 and first and second porous webs 46 and 48 proximate the cathode 24. The first polymer separator 42 is oxidation-resistant under conditions of operation of the metal-air cell and is permeable to electrolyte, but substantially impermeable to ions and compounds of the metal from the anodic layer 12. Thus, the first separator 42 allows the flow of electrolyte but retains the metallic ions and compounds from the anodic layer 12 at the anode 10 and separate from the other components of the metal-air cell. The first separator 42 extends substantially completely across the entire surface of the porous web 36 adjacent the anode 10 and also inhibits the growth of metal dendrites on the anode. The second separator 44 is identical to the first separator 42 in structure and function and is positioned contiguously to the first separator 42. A suitable material for the separators 42 and 44 is 3501 CELGARD wettable microporous polypropylene from Hoechst Celanese Corporation of Charlotte, N.C.

The first and second porous webs 46 and 48 proximate the cathode 24 are porous webs of entangled strands for absorbing electrolyte and wicking the electrolyte across the entire cathode. The porous webs 46 and 48 also space the cathode 24 from the separators 42 and 44 and the anode 10. The first and second porous webs 46 and 48 extend contiguously to one another between the second polymer separator 44 and the air cathode 24. A suitable material for the first and second porous webs 46 and 48 is Nylon #TR1113G available from Hollingsworth & Vose of East Walpole, Mass.

The anode 10, air cathode 24, electrolyte, porous web 36, and the separator package 40 are all disposed in the cell case 26 comprising a substantially planar, rectangular first member 52 and a substantially rectangular second member 54 having the shape of an inverted tray. The first member 52 is heat welded to the second member 54 to form the rectangular, box-shaped case 26.

The anode 10, the porous web 36 proximate the anode, and the separator package 40 extend between a rectangular support 56 which fits about the interior of the cell case 26. A gas-permeable, liquid-impermeable membrane 58 fits tightly between the cell case 26 and the rectangular support 56. The membrane 58 extends across the air side 30 of the cathode 24 and allows passage of air to and from the cathode but seals electrolyte within the cell case 26. A suitable material for the membrane 58 is CELGARD 2400 microporous polypropylene membrane available from Hoechst Celanese Corporation of Charlotte, N.C.

The cell case 26 also includes a mask member 60 which extends over and is spaced from the air cathode 24. The mask 60 forms an air plenum over the air cathode 24 and has a plurality of openings 62 substantially evenly distributed across the mask member for allowing air to enter the cathode plenum. The mask member 60 controls the exposure of the air cathode 24 to air. The mask member 60 allows a sufficient amount of air to the cathode 24 for adequate power production from the cell, but limits the exposure of the air cathode to air to minimize exposure of the air cathode to moisture and contaminants to prevent premature failure of the cell from flooding, drying out, or contamination. Although not shown in FIG. 3, the cathode plenum formed by the mask member 60 can include a grid structure for maintaining separation between the mask member and the air cathode 24. Alternatively, the cathode plenum can be filled with a porous material, such as a non-woven fibrous material. A suitable mask member is disclosed in U.S. Pat. No. 5,328,777 filed on Jul. 14, 1992 and entitled "Cathode Cover for Metal-Air Cell," the disclosure of which is expressly incorporated herein by reference in its entirety.

The cell case 26 also includes a number of gas release vents 65 in the first member 52 of the cell case. The vents 65 include recesses 67 in the first member 52 with a central opening 68 therein covered with a gas-permeable, liquid-impermeable plug 70. This plug 70 releases gases, such as hydrogen, which build up inside the metal-air cell 22 during operation but does not allow leakage of electrolyte. The plug 70 comprises a plug of ultrafine polyethylene 4925 available from Porex Corporation in Fairburn, Ga., sandwiched between a porous polypropylene film and a teflon film. The teflon film faces the anode 1. The polypropylene film is a CELGARD microporous membrane available from Hoechst Celanese Corporation, in Charlotte, N.C. Preferred CELGARD microporous membranes are CELGARD 2400 and 2500 membranes. These membranes are heat welded or embossed onto the first member 52 of the cell case 26.

Figures 4, 5:
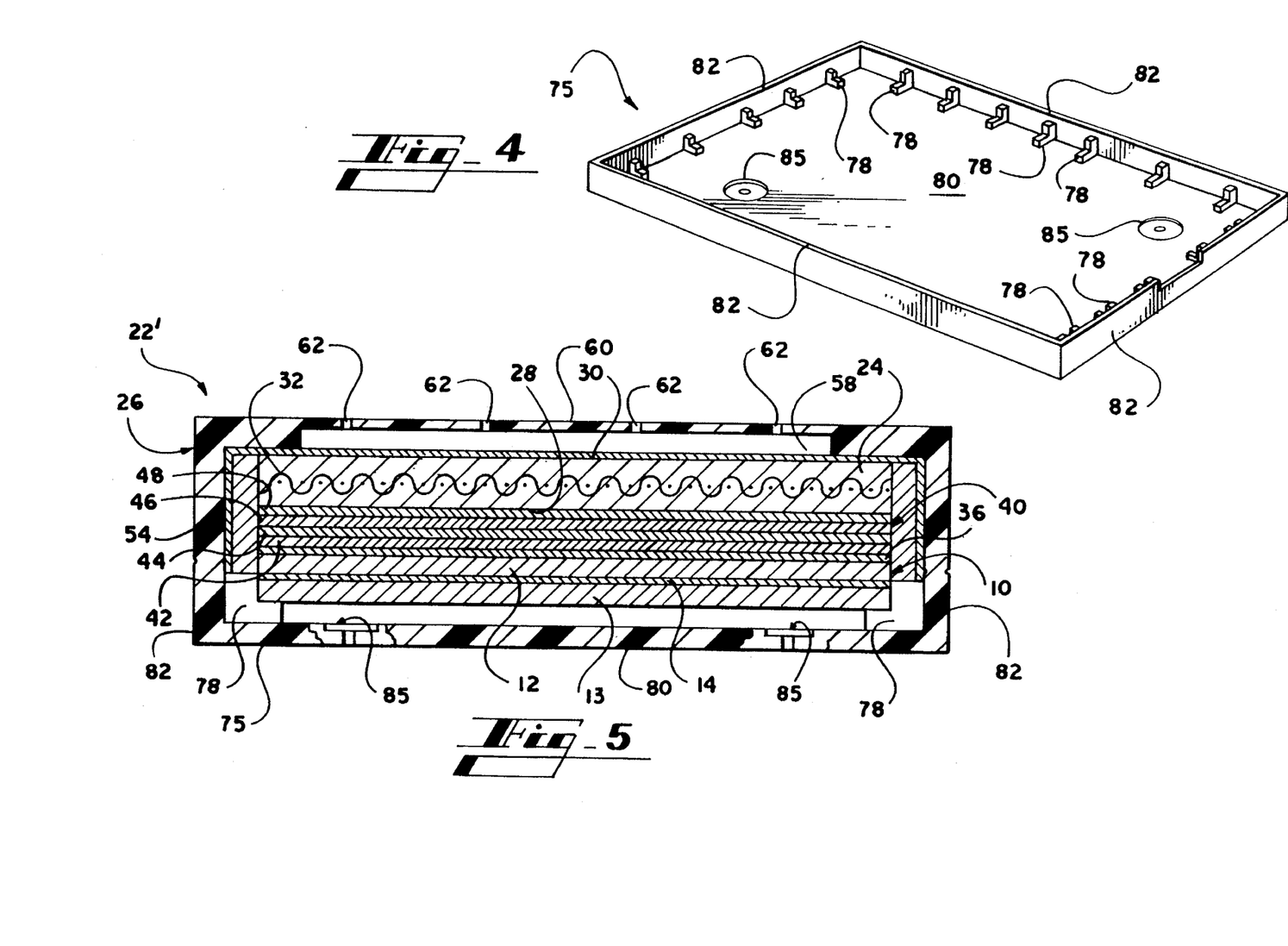
FIG. 4 is a perspective view of an anode case which forms part of a metal-air cell made according to another embodiment of the present invention.
FIG. 5 is a partial, cross-sectional, elevation view of a metal-air cell including the anode case shown in FIG. 4.

Turning to FIG. 4, an alternative embodiment 75 of the first member of the cell case 26 is shown. The first member of the cell case 26 is also referred to herein as the anode case because the anode 10 is housed in the first member of the cell case. The anode case 75 shown in FIG. 4 has the same structure as the first member 52 of the cell case 26 shown in FIG. 3 except that the anode case 75 in FIG. 4 includes a plurality of L-shaped spacers 78 integral with and extending from the interior of the anode case about the periphery of the anode case. The L-shaped spacers 78 are spaced from one another and space the anode 10 of the cell 22' from the anode case 75 as shown in FIG. 5. The cell 22' shown in FIG. 5 has the same structure as the cell 22 shown in FIG. 3 except that the cell 22' shown in FIG. 5 includes the anode case 75 shown in FIG. 4.

The rigid support 13 of the anode 10 is mounted on the L-shaped spacers 78 of the anode case 75 and is spaced from the main panel 80 of the anode case and the side walls 82 of the anode case by the L-shaped spacers. The anode case 75 also includes gas release vents 85 which have the same structure as the gas vents 65 in the first member of the cell case 26 shown in FIG. 3.

The gap between the anode case 75 and the rigid support 13 formed by the L-shaped spacers 78 provides a flow path for the release of gas produced at the anode 10. Gas can flow from the anodic layer 12 and current collector 14 of the anode 10 between the side walls 82 of the anode case 75 and between the main panel 80 of the anode case and the rigid support 13 to the gas vents 85 for release from the cell 22'.

Alternative embodiments of the rigid support of the anode of the present invention are shown in FIGS. 6A–D, 7, 8A, and 8B. These rigid supports can be made of the same material used to make the rigid support 13 described above.

Figure 6A:
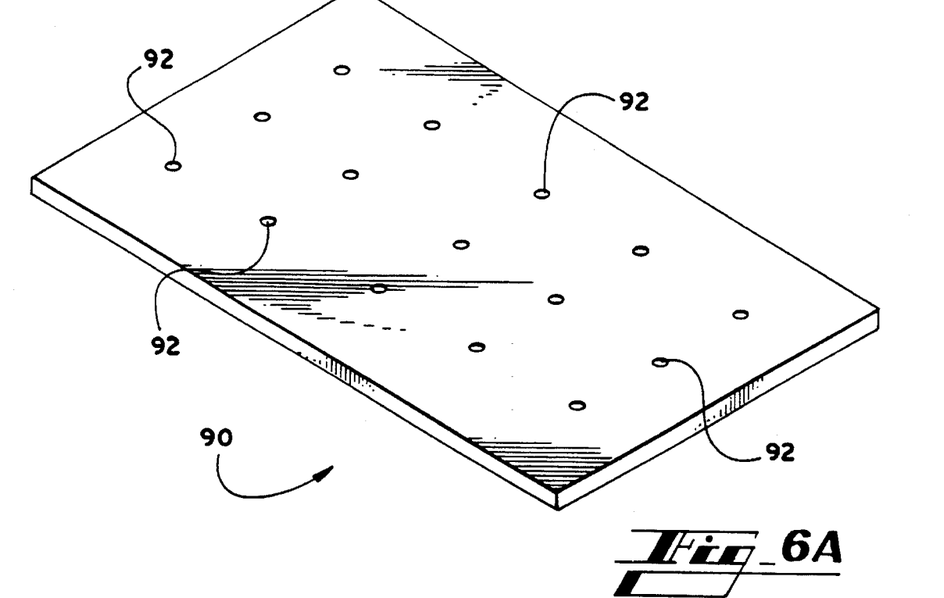
FIG. 6A is a perspective view of a perforated anode support made according to an alternative embodiment of the present invention.
Figure 6B:
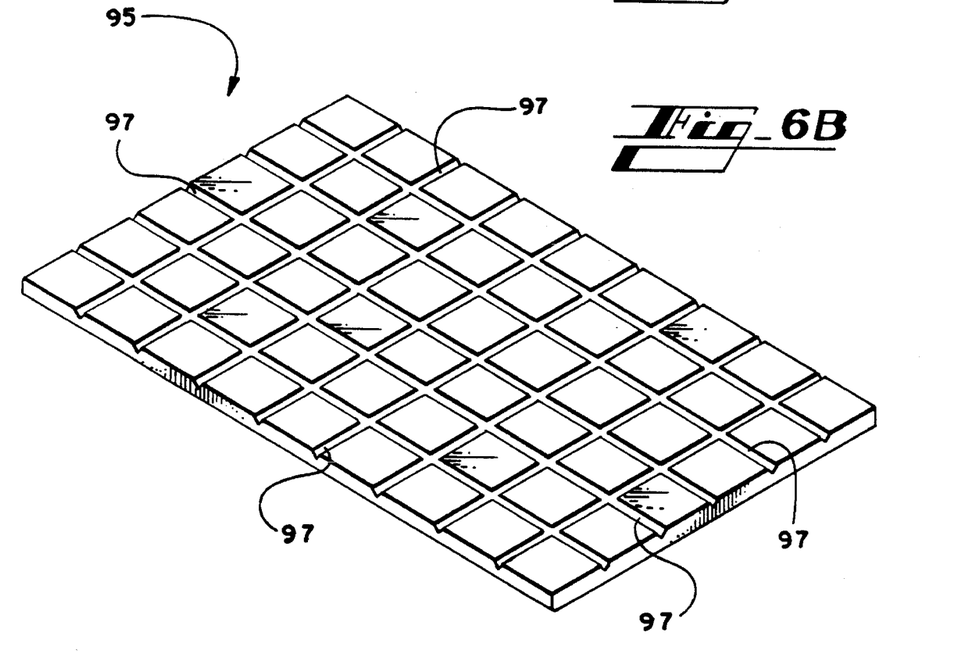
FIG. 6B is a perspective view of an anode support having channels, the anode support being made according to another embodiment of the present invention.

FIG. 6A shows a rigid support 90 comprising a rectangular sheet with a plurality of pinholes 92 substantially evenly distributed across the rigid support for releasing gas from the anode. Another rigid support 95 shown in FIG. 6B also comprises a rectangular sheet of rigid material but has a network of channels 97 running across the side of the rigid support that faces the current collector. The channels 97 provide a flow path for the release of gas from the anode.

Figure 6C:
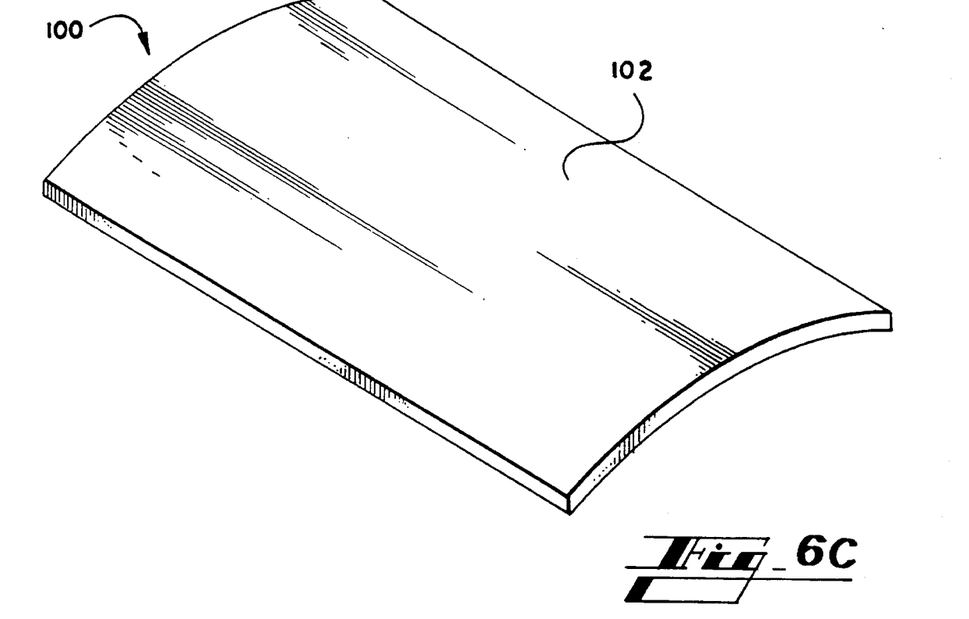
FIG. 6C is a perspective view of a bowed anode support made according to still another embodiment of the present invention.

FIG. 6C shows a bowed rigid support 100. The bowed support 100 comprises a bowed sheet of rigid material that functions as a mechanical spring. When the bowed support 100 is substituted for the flat rigid support 13 shown in FIG. 3, the convex side 102 of the bowed support faces the current collector 14 and the bowed support is compressed so as to be substantially flat as the rigid support 13 is shown in FIGS. 3 and 5. The compressed, bowed support 100 acts like a mechanical spring and forces the current collector 14 flush against the anodic layer 12 to maintain even contact between the current collector and the anodic layer throughout the life of the cell.

Figure 6D:
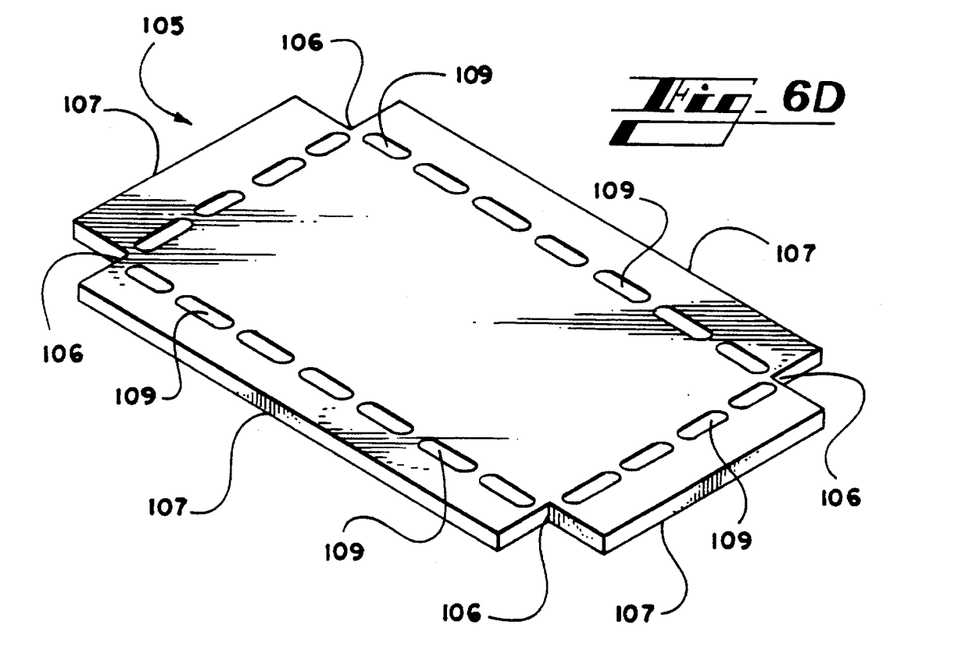
FIG. 6D is a perspective view of an anode support having a ring of openings about the periphery of the anode support which is made according to yet another embodiment of the present invention.

Another rigid support 105 that functions as a mechanical spring is shown in FIG. 6D. This rigid support 105 includes a rectangular rigid plate with the corners 106 cutout to form rectangular leaf springs 107 along each edge. The support 105 further has rows of holes 109 extending between the cutout corners 108 to enhance the spring effect of the rigid support. The rigid support 105 shown in FIG. 6D functions in a similar manner as the bowed support 100 shown in FIG. 6C and can be substituted for the rigid support 13 shown in FIGS. 3 and 5.

Figure 7:
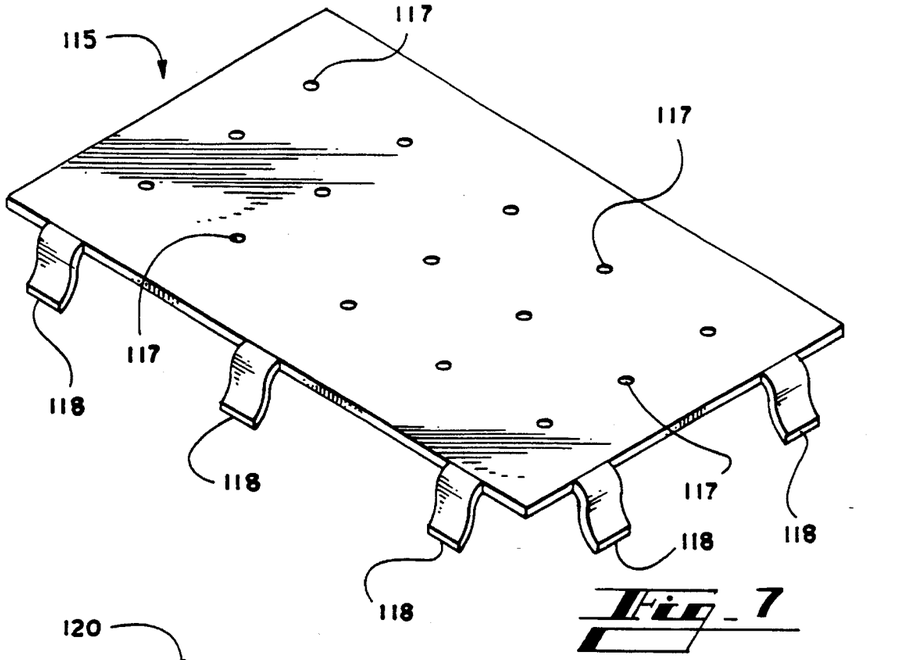
FIG. 7 is a perspective view of an anode support comprising leaf springs, the anode support being made according to an alternative embodiment of the present invention.

FIG. 7 shows still another rigid support 115 comprising a rectangular sheet of rigid material. This rigid support 115 has a plurality of pinholes 117 distributed substantially uniformly across the rigid support for releasing gas from the anode and includes a plurality of contoured tabs 118 extending out the plane of the flat sheet of the rigid support from the periphery of the flat sheet. The tabs 118 function as leaf springs when the rigid support 115 is incorporated into a cell. The rigid cell 115 can replace the rigid support 13 in the metal air cells shown in FIGS. 3 and 5. This rigid support 115 fits in such a cell so that the tabs 118 fit against the first member 52 of the cell case 26. The rigid support 115 is compressed when incorporated into such a cell and functions as a mechanical spring to force the current collector 14 flush against the anodic layer 12 of the anode 10.

Figure 8A:
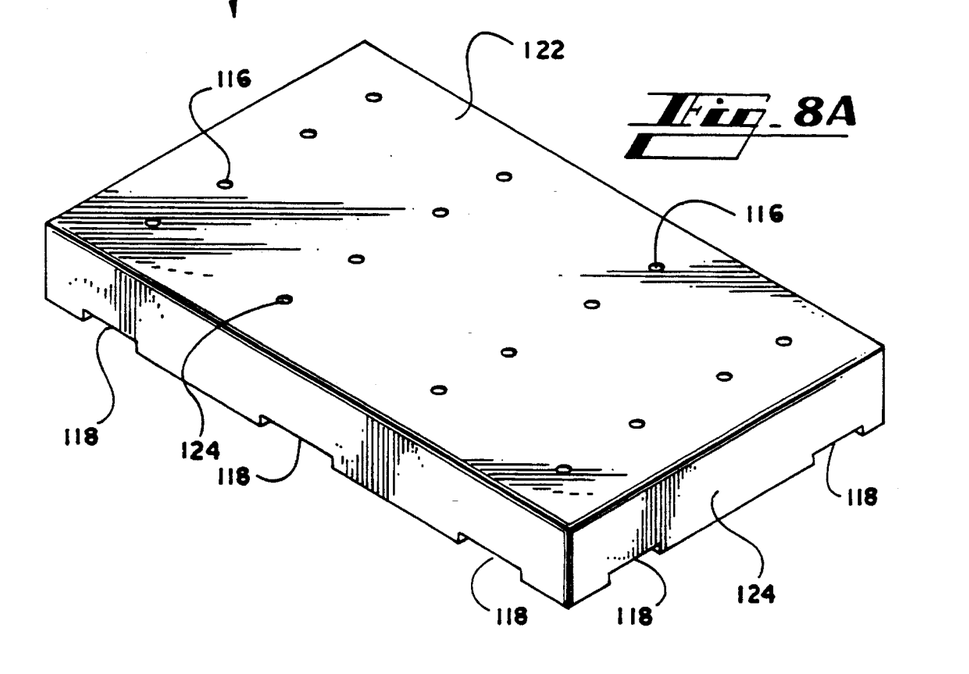
FIG. 8A is a perspective view of a perforated, box-shaped anode support made according to an another embodiment of the present invention.
Figure 8B:
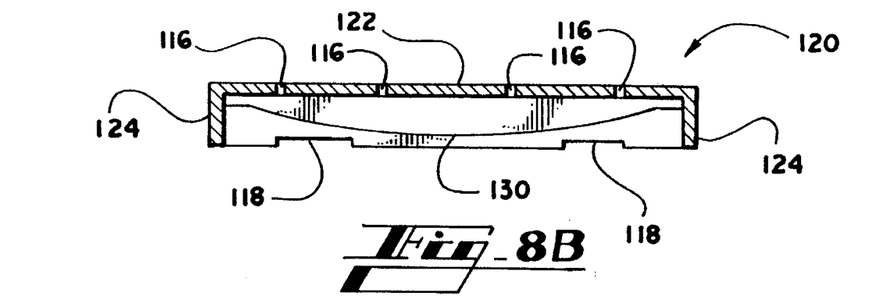
FIG. 8B is a partial, cross-sectional, elevation view of the anode support shown in FIG. 8B.

FIGS. 8A and 8B illustrate yet another embodiment of a rigid support 120 for use with the anode of the present invention. This rigid support comprises a rectangular main panel 122 and side walls 124 extending from each of the four edges of the main panel to form a box-shaped support. The main panel 122 of this rigid support 120 has a plurality of pinholes 126 for releasing gas from the anode. The side walls 124 include several notches 128 along the edges of the side walls opposite of the main panel 122. The notches 128 allow the flow of electrolyte and gas between the main panel 122 of the rigid support 120 and the case of the electrochemical cell in which the rigid support is used. This rigid support 120 can be substituted for the rigid support 13 in the cell shown in FIG. 3. The main panel 122 of the rigid support 120 fits against the current collector 14 of the anode 10 and the side walls 124 space the main panel from the first member 52 of the cell case 26. As shown in FIG. 8B, the rigid support 110 can also include one or more ribs 130 extending between the side walls 114 to add support to the main panel 112.

It should be understood that the foregoing relates to particular embodiments of the present invention, and that numerous changes may be made therein without departing from the spirit and scope of the invention as defined by the following claims.

We claim:

1. An anode for use in an electrochemical cell comprising:

an anodic layer of a metal which is capable of being oxidized in the cell to produce electricity during discharge of the cell, the anodic layer being a substantially solid sheet;

a current collector layer of a metal capable of conducting electricity produced during discharge of the cell but not being oxidized during discharge of the cell, the current collector layer being a substantially solid sheet, having a thickness less than about 10 mils and extending adjacent one side of the anodic layer; and a rigid support comprising a substantially solid sheet of a material that is not capable of being oxidized during discharge of the cell, the sheet of the rigid support extending adjacent one side of the current collector layer so that the current collector layer is sandwiched between the anodic layer and the rigid support.

2. An anode as in claim 1 wherein the current collector has a thickness less than about 4 mils.

3. An anode as in claim 1 wherein the current collector layer has an original configuration, the rigid support maintaining the current collector layer in a configuration substantially the same as the original configuration during discharging and recharging of the cell.

4. An anode as in claim 1 wherein the rigid support comprises a mechanical spring so that when the anode is mounted in a cell case, the rigid support can be forcibly biased against the one side of the current collector layer, which, in turn, is biased against the anodic layer.

5. An anode as in claim 4 wherein the mechanical spring comprises a bowed plate.

6. An anode as in claim 4 wherein the mechanical spring comprises a leaf spring.

7. An anode as in claim 4 wherein the rigid support comprises a panel and the mechanical spring comprises a plurality of leaf springs extending from the panel to respective distal ends.

8. An anode for use in an electrochemical cell comprising:

an anodic layer of a metal which is capable of being oxidized in the cell to produce electricity during discharge of the cell;

a current collector layer of a metal capable of conducting electricity produced during discharge of the cell but not being oxidized during discharge of the cell, the current collector layer having a thickness less than about 10 mils and extending adjacent one side of the anodic layer; and a rigid support comprising a material that is not capable of being oxidized during discharge of the cell, the rigid support extending adjacent one side of the current collector layer so that the current collector layer is sandwiched between the anodic layer and the rigid support, wherein the rigid support comprises a mechanical spring so that when the anode is mounted in a cell case, the rigid support can be forcibly biased against the one side of the current collector layer, the rigid support comprises a panel, the mechanical spring comprises a plurality of leaf springs extending from the panel to respective distal ends, and the panel of the rigid support has a periphery and the leaf springs extend outwardly from the periphery.

9. An anode as in claim 1 wherein the material of the rigid support comprises a layer of porous polypropylene.

10. An anode for use in an electrochemical cell comprising:

an anodic layer of a metal which is capable of being oxidized in the cell to produce electricity during discharge of the cell;

a current collector layer of a metal capable of conducting electricity produced during discharge of the cell but not being oxidized during discharge of the cell, the current collector layer having a thickness less than about 10 mils and extending adjacent one side of the anodic layer; and a rigid support comprising a material that is not capable of being oxidized during discharge of the cell, the rigid support extending adjacent one side of the current collector layer so that the current collector layer is sandwiched between the anodic layer and the rigid support, wherein the rigid support forms a flow path for releasing gas produced at the anode.

11. An anode as in claim 10 wherein the rigid support has channels which form the flow path.

12. An anode as in claim 10 wherein the rigid support has openings which form the flow path.

13. An anode as in claim 1 wherein the metal of the current collector comprises silver.

14. An anode for use in an electrochemical cell comprising:

an anodic layer of a metal which is capable of being oxidized in the cell to produce electricity during discharge of the cell;

a current collector layer of a metal capable of conducting electricity produced during discharge of the cell but not being oxidized during discharge of the cell, the current collector layer having a thickness less than about 4 mils and extending adjacent one side of the anodic layer; and a rigid support comprising a material that is not capable of being oxidized during discharge of the cell, the rigid support extending adjacent one side of the current collector layer so that the current collector layer is sandwiched between the anodic layer and the rigid support, wherein the metal of the current collector layer comprises metal foil.

15. An anode as in claim 14 wherein the metal of the current collector layer comprises silver foil.

16. An anode as in claim 1 wherein the metal of the current collector layer is plated onto the rigid support.

17. An anode as in claim 1 wherein the metal of the current collector layer is plated onto the one side of the anodic layer.

18. An anode as in claim 1 wherein the current collector layer extends across and covers substantially the entire one side of the anodic layer.

19. An anode for use in an electrochemical cell comprising:

an anodic layer of a metal which is capable of being oxidized in the cell to produce electricity during discharge of the cell;

a current collector layer of a metal capable of conducting electricity produced during discharge of the cell but not being oxidized during discharge of the cell, the current collector layer having a thickness less than about 10 mils and extending adjacent one side of the anodic layer; and a rigid support comprising a material that is not capable of being oxidized during discharge of the cell, the rigid support extending adjacent one side of the current collector layer so that the current collector layer is sandwiched between the anodic layer and the rigid support, wherein the current collector layer forms a flow path for releasing gas produced at the anode.

20. An anode as in claim 19 wherein the current collector layer has openings which form the flow path.

21. An anode for use in an electrochemical cell comprising:

an anodic layer of a metal which is capable of being oxidized in the cell to produce electricity during discharge of the cell;

a current collector layer of a metal capable of conducting electricity produced during discharge of the cell but not being oxidized during discharge of the cell, the current collector layer having a thickness less than about 10 mils and extending adjacent one side of the anodic layer; and a rigid support comprising a material that is not capable of being oxidized during discharge of the cell, the rigid support extending adjacent one side of the current collector layer so that the current collector layer is sandwiched between the anodic layer and the rigid support, wherein the current collector layer and the rigid support form a flow path for releasing gas produced at the anode.

22. An anode as in claim 21 wherein the current collector layer has openings and the rigid support has channels or openings which form the flow path.

23. An anode as in claim 1 wherein the metal of the anodic layer comprises zinc.

24. An anode as in claim 1 wherein the metal of the anodic layer comprises zinc and the metal of the current collector layer comprises silver.

25. An anode for use in an electrochemical cell comprising:

an anodic layer of a metal which is capable of being oxidized in the cell to produce electricity during discharge of the cell;

a current collector layer of a metal capable of conducting electricity produced during discharge of the cell but not being oxidized during discharge of the cell, the current collector layer having a thickness less than about 10 mils and extending adjacent one side of the anodic layer;

a rigid support comprising a material that is not capable of being oxidized during discharge of the cell, the rigid support extending adjacent one side of the current collector layer so that the current collector layer is sandwiched between the anodic layer and the rigid support, and an anode case, the anodic layer, current collector layer and rigid support disposed in the anode case, the anode case having an opening for releasing gas produced at the anode, and the rigid support mounted in the anode case and spaced apart from at least a portion of the anode case so that the gas can flow to and through the opening in the anode case.

26. An anode as in claim 25 wherein the anode case further comprises a panel and the opening for releasing gas produced at the anode, and the anode comprises a spacer extending between the anode case panel and the rigid support for spacing the rigid support apart from the anode case.

27. An anode as in claim 25 wherein the anode case further comprises a panel and a spacer extending integrally from the anode case, the panel comprising the opening for releasing gas produced at the anode, the rigid support being mounted on the spacer.

28. An anode as in claim 25 wherein the anode case further comprises a panel and the opening for releasing gas produced at the anode, and the rigid support comprises a spacer extending integrally from the rigid support to the anode case panel for spacing the rigid support apart from the anode case.

29. An anode as in claim 25 wherein the anode case comprises a main panel and side walls extending from the main panel, the rigid support being spaced from the main panel and the side walls of the anode case so that the gas can flow between the side walls and the rigid support and between the main panel and the rigid support.

30. An anode as in claim 25 wherein the rigid support has a periphery and the anode case further comprises a panel and a plurality of spacers extending from the anode case and spaced from one another, the panel comprising the opening for releasing gas produced at the anode, the rigid support being mounted on the plurality of spacers and the spacers being arranged about the periphery of the rigid support.

31. An anode as in claim 25 wherein the rigid support further comprises a mechanical spring so that when the anode is mounted in the anode case, the rigid support can be forcibly biased against the one side of the current collector layer.

32. An anode as in claim 31 wherein the mechanical spring comprises a bowed plate.

33. An anode as in claim 31 wherein the mechanical spring comprises a leaf spring.

34. An anode as in claim 31 wherein the rigid support comprises a panel and the mechanical spring comprises a plurality of leaf springs extending from the panel to respective distal ends.

35. An anode as in claim 34 wherein the panel of the rigid support has a periphery and the leaf springs extend outwardly from the periphery.

36. An anode as in claim 33 wherein the leaf spring spaces the rigid support from the anode case.

37. An anode for use in an electrochemical cell comprising:

an anodic layer of a metal which is capable of being oxidized in the cell to produce electricity during discharge of the cell;

a current collector layer of metal foil capable of conducting electricity produced during discharge of the cell but not being oxidized during discharge of the cell, the current collector layer extending adjacent one side of the anodic layer; and a rigid support comprising a material that is not capable of being oxidized during discharge of the cell, the rigid support extending adjacent one side of the current collector layer so that the current collector layer is sandwiched between the anodic layer and the rigid support.

38. An anode as in claim 37 wherein the metal foil of the current collector is silver foil.

39. An electrochemical cell comprising:

a. a case;

b. a cathode disposed in the cell case;

c. an anode disposed in the cell case, the anode comprising:

an anodic layer of a metal which is capable of being oxidized in the cell to produce electricity during discharge of the cell; and a current collector layer of metal capable of conducting electricity produced during discharge of the cell but not being oxidized during discharge of the cell, the current collector layer extending adjacent one side of the anodic layer;

d. electrolyte disposed in the cell case between the anode and the cathode; and e. a rigid support comprising a material that is not capable of being oxidized during discharge of the cell, the rigid support extending adjacent one side of the current collector layer so that the current collector layer is sandwiched between the anodic layer and the rigid support, the anode being between the cathode and the rigid support; the cell case having an opening for releasing gas produced at the anode, and the rigid support mounted in the case and spaced apart from at least a portion of the case so as to form a flow path for the gas to follow from the anode, to and through the opening in the case.

40. An electrochemical cell as in claim 39 wherein the current collector layer has a thickness less than about 10 mils.

41. An electrochemical cell as in claim 39 wherein the current collector layer has a thickness less than about 4 mils.

42. An electrochemical cell as in claim 41 wherein the current collector layer comprises a layer of metal foil.

43. An electrochemical cell as in claim 39 wherein the case further comprises a panel and the opening for releasing gas produced at the anode, and the cell comprises a spacer extending between the case panel and the rigid support for spacing the rigid support apart from the case.

44. An electrochemical cell as in claim 39 wherein the case further comprises a panel and a spacer extending integrally from the case, the panel comprising the opening for releasing gas produced at the anode, the rigid support being mounted on the spacer.

45. An electrochemical cell as in claim 39 wherein the case further comprises a panel and the opening for releasing gas produced at the anode, and the rigid support comprises a spacer extending integrally from the rigid support to the case panel for spacing the rigid support apart from the case.

46. An electrochemical cell as in claim 39 wherein the case comprises a main panel and side walls extending from the main panel, the rigid support being spaced from the main panel and the side walls of the case so that the gas can flow between the side walls of the case and the rigid support and between the main panel of the case and the rigid support.

47. An electrochemical cell as in claim 39 wherein the rigid support has a periphery and the case further comprises a panel and a plurality of spacers extending from the case and spaced from one another, the panel comprising the opening for releasing produced at the anode, the rigid support being mounted on the plurality of spacers and the spacers being arranged about the periphery of the rigid support.

48. An electrochemical cell as in claim 39 wherein the rigid support comprises a mechanical spring and is mounted in the case so as to be forcibly biased against the one side of the current collector layer.

49. An electrochemical cell as in claim 48 wherein the mechanical spring comprises a bowed plate.

50. An electrochemical cell as in claim 48 wherein the mechanical spring comprises a leaf spring.

51. An electrochemical cell as in claim 48 wherein the rigid support comprises a panel and the mechanical spring comprises a plurality of leaf springs extending from the panel of the rigid support to respective distal ends.

52. An electrochemical cell as in claim 51 wherein the panel of the rigid support has a periphery and the leaf springs extend outwardly from the periphery.

53. An electrochemical cell as in claim 50 wherein the leaf spring spaces the rigid support from the case.

54. An electrochemical cell comprising:
   a. a case;
   b. a cathode disposed in the cell case;
   c. an anode disposed in the cell case, the anode comprising:
      an anodic layer of a metal which is capable of being oxidized in the cell to produce electricity during discharge of the cell, the anodic layer being a substantially solid sheet; and
      a current collector layer of metal capable of conducting electricity produced during discharge of the cell but not being oxidized during discharge of the cell, the current collector layer being a substantially solid sheet and extending adjacent one side of the anodic layer;
   d. electrolyte disposed in the cell case between the anode and the cathode; and
   e. a rigid support comprising a substantially solid sheet of a material that is not capable of being oxidized during discharge of the cell, the sheet of the rigid support extending adjacent one side of the current collector layer so that the current collector layer is sandwiched between the anodic layer and the rigid support, the anode being between the cathode and the rigid support;
      the rigid support comprising a mechanical spring and being mounted in the case so as to be forcibly biased against the one side of the current collector layer, which, in turn, is forcibly biased against the anode.

55. An electrolytic cell as in claim 54 wherein the mechanical spring of the rigid support is a compressed bowed plate.

56. An electrolytic cell as in claim 54 wherein the mechanical spring of the rigid support is a leaf spring.

57. An electrochemical cell as in claim 56 wherein the rigid support comprises a panel and the mechanical spring comprises a plurality of leaf springs extending from the panel of the rigid support to respective distal ends.

58. An electrochemical cell as in claim 57 wherein the panel of the rigid support has a periphery and the leaf springs extend outwardly from the periphery to the panel of the case.

59. An electrochemical cell as in claim 56 wherein the leaf spring spaces the rigid support from the case.

* * * * *